Patented Sept. 1, 1931

1,821,856

UNITED STATES PATENT OFFICE

ALLEN L. SPAFFORD, OF CLOQUET, MINNESOTA, ASSIGNOR TO WOOD CONVERSION COMPANY, OF CLOQUET, MINNESOTA, A CORPORATION OF DELAWARE

MANUFACTURE OF DISTENDED FIBROUS MASSES

No Drawing. Application filed July 28, 1930. Serial No. 471,408.

The present invention relates to distended fibrous materials and to the process of producing the same. It has special reference to improvements in the process and the product described in the Bryant Patent No. 1,740,280, issued December 17, 1929.

The product described in said patent is a cellulose fibrous mat which is highly absorbent to water, and the mat is particularly adapted for use as an absorbent of water and liquids. The product is formed by drying a foam containing fibers. Its fluffy, distended form renders the product particularly useful as a sound absorbent, as a heat insulator, as a packing material, as a cushioning substance, and it has other uses, particularly constructional and protective, as a result of its form, rather than as a result of the properties of the fibers.

Although Bryant sets forth wool and asbestos as examples of other fibrous materials which may be used, it remains an economic fact that cellulose fibers, such as ground wood pulp, semi-chemical wood pulp, cotton fiber, and high or low grade chemical wood pulp are by far the preferred fibers for constructional and protective purposes. Cellulose fibers of the character above mentioned are ordinarily water absorbent. In constructional uses, as insulation, or in protective uses, as cushions and packing, the fibers may be exposed to water or dampness to such a degree that water absorbed by them breaks down the characteristic fluffy form of the Bryant product from ordinary pulp, and the product therefore becomes useless upon loss of its form. When wet it mats down like absorbent cotton.

Furthermore, the product made from ordinary pulp or celluuose fibers is highly inflammable. In constructional use this is highly objectionable, and the material may even be barred by statute or by insurance regulations because of its combustible character.

The objects of the present invention include the proofing of cellulose or of other vegetable fibers against water and/or fire prior to the formation of the fibers into the distended mass produced by the Bryant process. It aims to produce a fire-proof mat, a water-proof mat, and a fire-and-water-proof mat.

It is also an object of the invention to introduce into the mat a setting substance which on drying makes a rigid product, or which sets without drying, such as a clay, or plaster of Paris, to give to the mass a more mineral character in adding to its properties for constructional uses.

In carrying out the present invention a number of steps may be considered. In general they comprise, first, proofing the fibers by a process which makes a product not incompatible with a foam-forming agent later to be used; second, formation of a foam containing the fibers; third, formation of mass free from liquid water; and fourth, drying the formed mass.

Various materials may be used as foam-forming agents, many of which are well known in the laboratory and in the industry, such as the froth floatation processes for mineral separation. Some suitable agents are soluble salts. Soap is an example of such, being usually the sodium salt of a fatty acid. Soap may be ineffective in the Bryant process using proofed fibers which contain mineral ingredients capable of reacting with the soap to form insoluble salts. Aluminum and calcium compounds in the proofed fibers are subject to reaction with ordinary sodium or potassium soaps to form water-insoluble aluminum or calcium soaps which are not effective foam formers. Accordingly, the operation of frothing the mass of fibers must be considered with regard for the materials present in the proofed fibers.

Saponin, and other foaming agents, are not of salt form. They are therefore preferred, but the invention is not limited to them. Any foaming agent may be used which is compatible with the proofed fibers or other materials which are present in the mass to be foamed. Indeed one material might be a foaming agent for one mass, and might not be a foaming agent for a different mass. It might also be a foaming agent in a larger quantity and not be a foaming agent in a lesser quantity, and this may be due to some opposing effect or reaction by material present in the mass to be foamed, particularly in the proofed fibers to be employed.

The invention is not limited to any particular method of proofing fibers. Various known methods of water-proofing or of fire-proofing may be employed, a suitable foaming agent is used.

For fire-proofing fibers the process of the Weiss Patent No. 1,339,488 of May 11, 1920, may be employed, whereby an insoluble salt, such as magnesium borate, is precipitated in the fibers. Aluminum stearate may be formed in or on the fibers, which will both fire-proof and water-proof them. Aluminum resinates may be precipitated by reaction of alum and rosin in a well known manner.

Water-proofing may be effected with other water-repellant substances, such as waxes. As an example of water-proofing with a wax, I may take 5000 parts by weight of air dried fibers, not necessarily dried, but weighed upon that basis, such as wood pulp known as the semi-chemical pulp. This is treated with an emulsion of wax, and the wax precipitated from the mixture onto the fibers.

The emulsion may be formed from 100 parts by weight of paraffin wax, which may be softened or melted by heat, 200 parts by weight of clay, such as kaolin of 40 to 200 mesh, preferably the latter, or finer, and about 33,300 parts by weight of a colloidal starch solution containing about 32 parts by weight of starch. The starch solution, wax and clay are beat into an emulsion. Heat may be employed to aid in distributing the wax more readily. The pulp may be placed in a beater at about a 4% slurry, and the emulsion added to the beater. The two are thoroughly mixed. The consistency is reduced to about a 3% slurry by mixing the emulsion into the 4% slurry in the beater. Then aluminum sulphate (alum), preferably as a solution, is added until the liquid has a hydrogen ion concentration, or an acidity, of about a pH of 4.8. The alum serves to precipitate the wax on the fibers. Clay is also deposited and the result is a water-proofed mass of fibers.

The above example is given to illustrate proofing methods either for water-proofing or for fire-proofing or for water-and-fire-proofing, for reasons which will appear directly.

The pulp slurry which is the usual result of proofing processes for fibers may be suitable for the addition to it directly of some foaming agent not incompatible with the slurry. Such a slurry with the added foaming agent could be aerated and foamed to form the required stable bubbles as hereinafter described. However, soluble impurities in the slurry may thus be retained by the fibers and would therefore be present in the final product after drying. In order, therefore, to remove water-soluble impurities, and possibly to make the slurry or the pulp more compatible with a larger number of foaming agents or with a less amount of a foaming agent, the excess liquid in the slurry from the proofing process may be removed from the fibers. A simple drainage may be carried out. Suction drainage, a filter press, or a squeeze press may be employed. If desired, washing with water may be practiced.

The proofed fibers, either in the slurry from the proofing process, or preferably the drained or washed fibers therefrom, are then subjected to the foaming process as described in the Bryant Patent No. 1,740,280. A large volume of water may be used in proportion to the fibers. The wet pulp, or the pulp slurry, is preferably added to a solution of the foaming agent. In the mass to be foamed, saponin may be used in the proportion of one part to 400 parts of water. The three percent slurry described may be diluted to a slurry of 2% to 2½%. Vigorous agitation, beating or whipping may be practiced to induce foam formation up to a point where a stable foam is formed in which the fibers are well separated and distributed.

The foam is then transferred either in batch portions or in a continuous stream to a drainer, which may be a mould, or a felting wire like that used in a paper machine. The function of the drainer is to form the mass into a predetermined shape or size and to carry off excess water from the mass, whereby the residual drained mass may dry. The foam may be extruded onto a moving screen, much as paper is formed, and dried without subjecting the web to tension or compression unless such action is desired top roduce a definite density or other specific quality which may result. The foam may also be spread into frames with a screen bottom in order to dry out in the shape and size of the frame opening. A mass of foam may be placed in a closed chamber which may be slowly evacuated further to distend the fibers, and heat may be applied to hasten evaporation of moisture under influence of the vacuum.

In the specific example herein given for water-proofing cellulose fibers, the wax and clay impart a rigidity to the fibers which they would not ordinarily have. A residual amount of starch from the proofing process may increase the rigidity. Clay is an example of a mineral which on drying has a setting property. Rigidity may also be imparted by other minerals than clay. For example, plaster of Paris has a setting property when wet, and the incorporation of plaster of Paris in the foam will more easily cause it to set while wet. To use plater of Paris, it may be added near the end of the foaming process, and is preferably added as a freshly made water suspension, and then quickly and thoroughly distributed throughout the mass.

Large or small quantities of plaster of Paris may be used according to the result desired. Very large amounts will render the product correspondingly plaster-like in character, yet the body will be fibrous.

Addition of other materials like casein may be practiced to produce rigidity, as suggested by Bryant. Other variations mentioned or suggested as to the process of the Bryant patent may be practiced in carrying out the present invention, without departing from the spirit and scope of the invention as expressed in the appended claims.

I claim:

1. A process of treating chemically proofed fibers to produce a fluffy mass, which comprises incorporating with the proofed fibers a chemical solution containing relatively stable air bubbles which solution is compatible with the proofed fibers to maintain the bubbles, and drying the mass, said air bubbles serving to maintain said fibers in separated condition during the drying of said mass.

2. A process of treating fibrous material containing a chemical proofing substance which comprises distending the fibers thereof through introduction between the fibers of an agent containing relatively stable induced bubbles, and drying the mass, said agent being compatible with the proofing substance to maintain said bubbles for drying the mass in distended form.

3. A process of treating fibrous pulp containing mineral ingredients as a proofing substance, which comprises mixing with the pulp a foaming agent incapable of reaction with the mineral ingredient of the proofing substance, agitating the mixture to separate the fibers of the pulp and to incorporate with the fibers relatively stable air bubbles, and drying the mixture with the fibers in distended form.

4. A process of treating vegetable fibers containing a chemical proofing substance, which comprises mixing said fibers and a chemically compatible solution capable of incorporating relatively stable bubbles in the presence of said proofing agent, agitating said mixture to effect incorporation of the bubbles with the fibers of said material, and drying the material with the bubbles incorporated therewithin.

5. A process of treating cellulose fibers which comprises chemically proofing said cellulose fibers with an addition agent, mixing the proofed fibers with a saponin solution, agitating the solution containing the fibers to form a bibulous, aerated mass, and drying said mass.

6. A process of treating cellulose fibers which comprises chemically proofing said cellulose fibers with an addition agent, distending the fibers through the incorporation with the fibers of a saponaceous lather which is relatively stable in the presence of said addition agent, and drying said material while in distended condition.

7. A process of treating fibrous cellulose which comprises chemically proofing said cellulose fibers with an addition agent, mixing a solution of a saponaceous material and said proofed cellulose fibers, agitating said material to induce incorporation of the lather with said fibers, and drying the lather with the fibers incorporated therein, said saponaceous material being capable of producing a stable lather in the presence of said addition agent.

8. A process of making a distended mass of proofed cellulose fibers which comprises subjecting cellulose fibers to the action of a proofing substance in a liquid bath, separating the fibers from excess liquid, incorporating and separating the fibers into a solution of a foaming agent capable of forming a stable lather in the presence of the proofed fibers, agitating the mixture to form stable bubbles and to distribute the fibers throughout the lather, and drying the resulting mass.

9. A process of treating absorbent fibrous material to form a fluffy water-proof mass which comprises water-proofing the fibers by incorporating therewith a water-proofing agent, distending the fibers through the introduction between the fibers of an agent containing bubbles which are relatively stable in the presence of the proofed fibers.

10. A process of treating fibrous cellulose which comprises proofing the fibers with an addition agent, mixing the proofed fibers with a foam-forming solution capable of producing stable bubbles in the presence of said addition agent, agitating the mixture to form a stable foam, and drying the foam.

11. A process of treating fibrous material to produce an expanded volume which comprises mixing the fibrous matter with a foam-forming solution, agitating said mixture to produce a foam, incorporating into the foam an agent capable of setting when wet, and drying the foam.

12. A process of treating fibrous material to produce an expanded volume which comprises mixing the fibrous matter with a foam-forming solution, agitating said mixture to produce a foam, adding plaster of Paris in distributed form and incorporating the same throughout the foam, and drying the foam.

13. A process of treating fibrous material to produce an expanded volume which comprises mixing the fibrous matter, a mineral ingredient capable of setting, and a foam-forming solution, agitating said mixture to produce a foam, and drying the foam.

14. A process of treating fibrous material to produce an expanded volume of water-proof fibers which comprises mixing fibers with an emulsion of clay, wax and a protective colloid, precipitating the emulsion onto the fibers by altering the hydrogen-ion concentration of the mixture, adding the resulting fibers to a foam-forming solution, agitating the mass to form a foam, and drying the foam.

15. A fibrous mass comprising loosely associated fibers carrying a proofing agent, said fibers incorporating in the mass the dried residue of a foam.

16. A dried lather containing waterproofed fibers.

17. A dried lather containing fibers incorporating a proofing agent.

18. A dried lather containing waterproofed cellulose fibers.

19. A dried lather containing cellulose fibers incorporating a precipitated emulsion of clay and a hydrocarbon.

20. A dried lather containing cellulose fibers and containing a set mineral ingredient.

21. A dried lather containing fibers and containing a mineral ingredient capable of setting in a wet lather.

22. A dried lather containing fibers and containing plaster of Paris set in the wet lather.

In testimony whereof I have hereunto affixed my signature.

ALLEN L. SPAFFORD.